United States Patent
Hao et al.

(10) Patent No.: US 6,347,983 B1
(45) Date of Patent: Feb. 19, 2002

(54) ELG FOR BOTH MRE SENSOR HEIGHT AND RESISTANCE MONITORING

(75) Inventors: Shanlin Hao, Eden Prairie; James K. Price, Tonku Bay; Dongming Liu, Eden Prairie, all of MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/589,926

(22) Filed: Jun. 7, 2000

Related U.S. Application Data

(60) Provisional application No. 60/138,310, filed on Jun. 9, 1999.

(51) Int. Cl.$^7$ .............................................. B24B 1/00
(52) U.S. Cl. ............................ 451/57; 451/5; 451/8; 451/10; 451/41; 451/908; 29/603.1; 29/603.9
(58) Field of Search ........................ 451/5, 8, 10, 41, 451/57, 908; 29/603.1, 603.9

(56) References Cited

U.S. PATENT DOCUMENTS

| | | | | |
|---|---|---|---|---|
| 4,689,877 A | * | 9/1987 | Church | 29/603 |
| 4,739,562 A | | 4/1988 | Kracke et al. | |
| 4,841,625 A | | 6/1989 | Valstyn | |
| 5,065,483 A | | 11/1991 | Zammit | |
| 5,175,938 A | * | 1/1993 | Smith | 33/567 |
| 5,210,667 A | | 5/1993 | Zammit | |
| 5,494,473 A | | 2/1996 | Dupuis et al. | |
| 5,597,340 A | * | 1/1997 | Church et al. | 451/5 |
| 5,722,155 A | | 3/1998 | Stover et al. | |
| 5,738,566 A | | 4/1998 | Li et al. | |
| 5,755,612 A | | 5/1998 | Schaenzer et al. | |
| 5,816,890 A | | 10/1998 | Hao et al. | |
| 5,876,264 A | | 3/1999 | Church et al. | |
| 5,885,131 A | | 3/1999 | Azarian et al. | |
| 5,913,550 A | | 6/1999 | Watanuki | |
| 5,951,371 A | | 9/1999 | Hao | |
| 5,997,381 A | | 12/1999 | Dee et al. | |
| 6,027,397 A | | 2/2000 | Church et al. | |
| 6,047,224 A | * | 4/2000 | Stover et al. | 700/119 |
| 6,083,081 A | | 7/2000 | Fukuroi et al. | |

\* cited by examiner

*Primary Examiner*—Joseph J. Hail, III
*Assistant Examiner*—Shantese McDonald
(74) *Attorney, Agent, or Firm*—Mitchell S. Feller; Clifford Chance Rogers & Wells

(57) ABSTRACT

A method and system for lapping a magnetic transducer using an electrical lapping guide is presented. This includes rough lapping the transducer based on a first signal and fine lapping the transducer based on a second signal from a dummy transducer. The dummy transducer can have electrical properties substantially similar to electrical properties of the magnetic transducer. The first signal can include a stripe height calculated as a function of a reference resistor element and an analog resistor element. The second signal can include lap to reader resistance from the dummy transducer and a stripe height calculated from a reference resistor element and an analog resistor element. The dummy transducer can also provide process noise monitoring capability during lapping.

20 Claims, 4 Drawing Sheets

ELG FOR BOTH MRE SENSOR HEIGHT AND RESISTANCE MONITORING

CROSS-REFERENCE TO RELATED APPLICATION

The present application claims the benefit of an earlier filed U.S. Provisional Application Serial No. 60/138,310, which was filed on Jun. 9, 1999, and is titled "ELG For Both MRE Sensor Height and Resistance Monitoring."

BACKGROUND

During the fabrication of magnetic heads for use in magnetic data storage applications, an array of transducers and auxiliary circuits are fabricated on a common substrate. To establish adequate performance for high efficiency recording heads, it is desirable to achieve the specified magnetoresistive element (MRE) sensor height within a very tight tolerance. One common practice is to use electrical lap guides (ELGs) and online bending mechanisms to form a closed-loop controlled lapping process as disclosed in U.S. Pat. No. 5,023,991. Such ELGs can be fabricated with the actual transducers through the same wafer processing. The ELGs predict the magnetoresistive (MR) transducer height, also known as the stripe height (SH), and feed this information to the bar lapping machine. The machine can take corrective action by adjusting the bending mechanism to minimize SH variation based on the predicted SH profile of the ELGs.

Thin film deposition techniques are often used to fabricate magnetic read/write transducers. In a typical process, an array of transducers and ELGs are formed on a common substrate by a deposition of metallic and nonmetallic layers. The patterning of the array of transducers and ELGs is accomplished using photolithography in combination with etching and lift-off processes. The finished array or wafer is then optically and electrically inspected and then sliced to produce bars, with one row of transducers in a side-by-side pattern on each bar. The bars are then lapped at the air bearing surface (ABS), which will eventually face the recording medium, to establish a specified sensor height. The bars of sliders are machined to obtain a desired SH or a desired inductive transducer height, also known as the throat height (TH). After diamond-like carbon processing, which protects the transducer from damage, and advanced air bearing processing, the bars are diced to produce individual transducers, heads, or sliders.

During machining of a particular row of transducers and ELGs, the machined surface moves from a beginning position to a final position while reducing the height of the transducers. The primary function of the ELGs is to control the machining process such that the desired transducer height is achieved. After a particular row of transducers is machined to the desired transducer height as controlled by the ELGs, the rows or bars are cut or diced into individual recording heads or sliders. After this process, the ELGs can be destroyed if desired.

Typically, each ELG includes one or more resistive elements, which are fabricated in the deposition of layers along with the sliders. A simple ELG design has one resistor that is aligned with a transducer such that the machining process reduces the height of both the transducer and the resistor at the same time. The resistance of the machined resistor (frequently referred to as the analog resistor) is monitored to determine when the desired height of the transducer has been achieved so that the machining process can be halted. Other ELG designs include at least two resistive components, one machined (analog) and typically one or two non-machined reference resistors. In some ELG designs, the resistance of each of the reference resistors is measured before lapping and used to calculate the local sheet resistance for the bar. The resistance of the machined resistor is compared to the constant resistance of one of the reference resistors during the machining process. When the resistance of the machined resistor equals the resistance of the reference resistor, the machining process is halted, presumably at the point where the height of the machined resistor is approximately equal to the desired transducer height.

FIG. 1 shows an ELG for a magnetoresistive or giant magnetoresistive transducer machining from U.S. Pat. No. 5,722,155. Measurements of reference resistor R2 102 and R3 103 are used to calculate local sheet resistance (Q), which is then combined with R1 101 (exposed and machined) measurement to estimate the MRE 104 sensor height.

The SH estimation is insensitive to sheet resistance (Q) variation or feature size variation (edge movement) caused in wafer processing. Continuously monitoring R2 102 and R3 103 allows compensation for resistance measurement variation caused by thermal effect or other sources during lapping. The three resistors are connected to each other and to terminals T1 105, T2 106, and T3 107, which is connected to a controller or data acquisition unit. The controller (not shown) measures the resistance of the resistors and controls the machining process as a function of the measured resistances and the desired machined height of the transducer 14.

ELG measurement accuracy—which is decreased due to errors introduced by the existence of mask or contact edge movement and noise—and ELG measurement resolution directly affect finished slider SH and TH variations. As higher density and lower cost requirements continuously drive the data storage industry, the transducer height tolerance continues to decrease, while the number of sliders and transducers per bar increases. This increased bar densification leads to thinner and more flexible bars with more sliders per bar. To maintain and improve transducer height control during the lapping process, more accurate ELG measurement and electrical resistance monitoring techniques are required.

SUMMARY

The present invention relates generally to the batch fabrication of sliders, which produce magnetoresistive and giant magnetoresistive read/write transducers for data storage applications. More particularly, the present invention relates to an improved ELG, which controls the machining process such that the transducers are machined to a specified height or resistance target.

Accordingly, the present invention provides a method of lapping a magnetic transducer. The method includes rough lapping the transducer based on a first signal and fine lapping the transducer based on a second signal from a dummy transducer. The dummy transducer can have electrical properties substantially similar to electrical properties of the magnetic transducer. The first signal can include a stripe height calculated as a function of a reference resistor element and an analog resistor element. The first signal can also include the stripe height calculated as a function of the reference resistor element's width, length, and resistance, and the analog resistor element's length and resistance. The analog resistor element can be exposed to machining before the stripe height is calculated. The reference resistor element can be approximately 40 µm wide and 700 µm long. The analog resistor element can be approximately 25 µm wide and 70 µm long. The stripe height can also be further calculated using a third resistor. The first signal can also include local sheet resistance calculated as a function of the reference resistor element's resistance, width, and length. The second signal can also include lap to reader resistance from the dummy transducer and a stripe height calculated from a reference resistor element and an analog resistor element. The dummy transducer can also provide process noise monitoring capability during lapping.

In another embodiment, the invention provides an electrical lap guide system for use in lapping a magnetic transducer. The system includes resistor elements and a dummy transducer. The resistor elements are used to control rough lapping and the dummy transducer is used to measure the electrical properties of the transducer to control fine lapping. The resistor elements can further include an analog resistor element and a reference resistor element. The reference resistor element can be used to calculate local sheet resistance as a function of the reference resistor element's resistance, width, and length. The analog resistor element can be machined before being used to calculate a stripe height as a function of the reference resistor's width, length, and resistance, and the analog resistor's length and resistance. The dummy transducer can further include shields, which provide process noise monitoring capability during lapping. The reference resistor element can be approximately 40 μm wide and 700 μm long, and the analog resistor element can be approximately 25 μm wide and 70 μm long. A third resistor element can be used. The analog resistor element, reference resistor element and third resistor element can be used to calculate stripe height for rough lap control. The analog resistor element, reference resistor element, and dummy transducer can be divided into two groups on a bar separated by the magnetic transducers. The first group can include a first dummy transducer and the analog resistor, and the second group can include a second dummy transducer and the reference resistor.

The details of one or more embodiments of the invention are set forth in the accompanying drawings and the description below. Implementations can provide advantages such as improved ELG measurement accuracy—which is due to decreased errors introduced by the existence of mask or contact edge movement and noise—and improved ELG measurement resolution, both of which directly affect finished slider SH and TH variations. The improved ELG measurement accuracy can increase density and lower cost requirements for producing discs by increasing the number of sliders and transducers per bar.

DETAILED DESCRIPTION

To improve transducer electrical performance, it is desirable to have an online measurement capability of both the MRE sensor height and the MRE resistance for slider machining process control.

MRE resistance is affected by a combination of many factors, including sensor height, transducer width, sheet resistance, contact resistance, and lead resistance. The structure and geometry of the MRE can affect its electrical characteristics. By using a dummy transducer, it is possible to measure these electrical characteristics without affecting the actual characteristics of the transducer.

Figure 1:
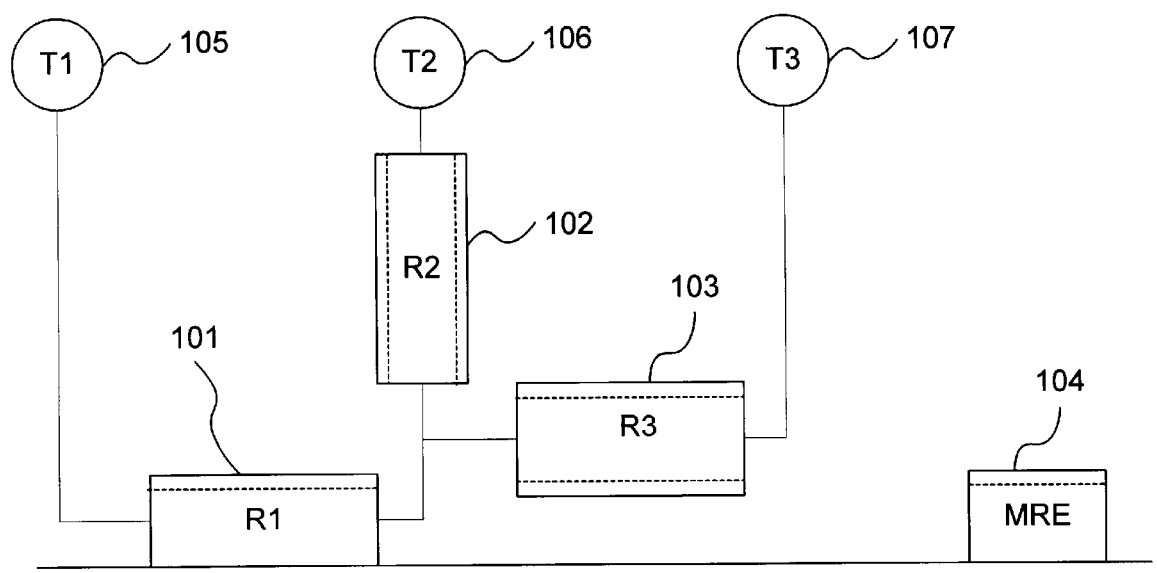
FIG. 1 is a conventional ELG control system.
Figure 2:
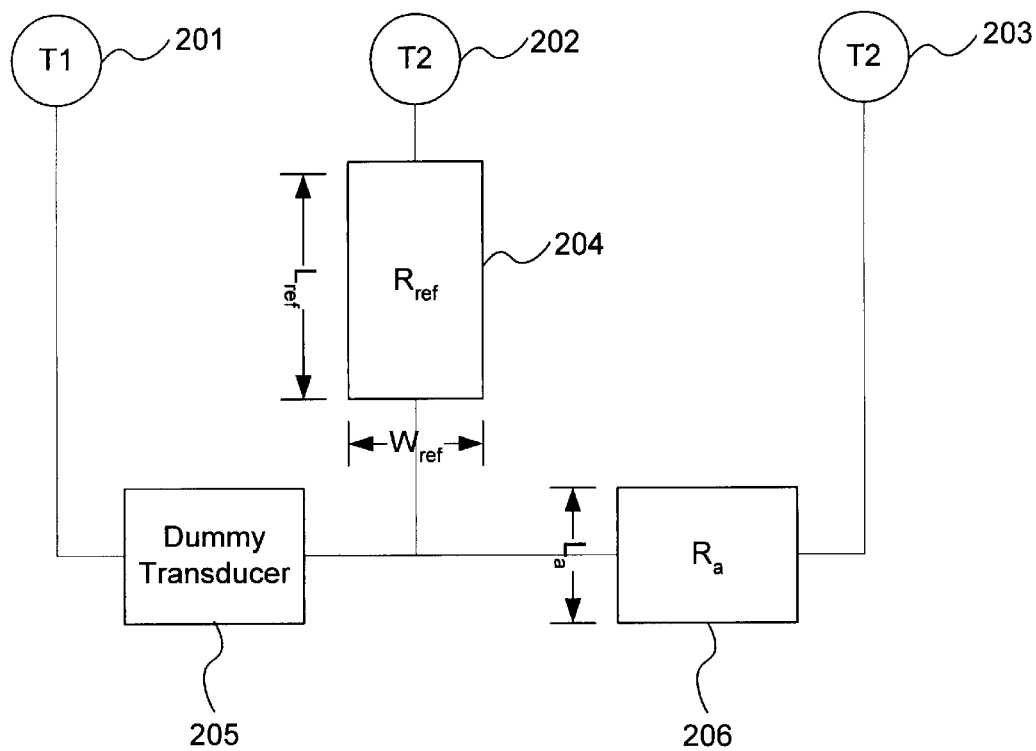
FIG. 2 is the ELG system for both MRE sensor height and resistance monitoring.

Referring now to FIG. 2, one embodiment of the ELG includes three elements: dummy transducer 205, reference resistor ($R_{ref}$) 204 and analog resistor ($R_a$) 206. The resistors and dummy transducer are connected to each other and to a terminal. The dummy transducer 205 is connected to terminal T1 205. The reference resistor is connected to terminal T2 202. And the analog resistor 206 is connected to terminal T3 203. The terminals are configured for connection to a controller, which controls the lapping of the transducer. In other embodiments, three or more resistors can be used to gain more accurate resistance readings.

The dummy transducer 205 and actual transducer have similar electrical characteristics. This can be achieved by the dummy transducer 205 and actual transducer having similar structure, using similar materials, being deposited in similar process steps, and undergoing similar subsequent process steps. The measured signals from the dummy transducer 205 can be used to control the actual transducer's resistance. Inclusion of shields in the dummy transducer structure can provide process noise (also known as smearing) monitoring capability during lapping.

$R_{ref}$ 204 is used to estimate local sheet resistance (Q). Typical wafer probe data indicate a 0.1–0.2 μm feature edge movement. To minimize the error from feature edge movement during wafer processing, $R_{ref}$ 204 can be long and wide. If the reference resistor in ELG is greater than approximately 30 μm wide, then the effect of delta, which is the difference between the actual physical width and the mask width, on sensor height calculation can be minimum, or less than one percent. Typical dimensions for the reference resistor is approximately 40 μm wide and 700 μm long. Equation 1 shows the equation for $R_{ref}$ 204.

$$R_{ref} = \frac{QL_{ref}}{W_{ref}} \qquad \text{Equation 1}$$

Typical wafer probe data also indicate an approximate 4–10% Q variation across a bar, which needs to be factored into the sensor height calculation.

$R_a$ 206 is exposed to machining. With zero mask offset between the back edge of the transducer and the back edge of $R_a$, the sensor height can calculated by Equation 2.

$$SH = \frac{QL_a}{R_a} \qquad \text{Equation 2}$$

Typical dimensions for $R_a$ are 25 μm wide and 70 μm long. The ratio of $$\frac{R_{ref}}{R_a}$$

in the sensor height calculation, as shown by equation 3 where Q is substituted according to Equation 1, eliminates thermal effect and data acquisition unit gain error.

$$SH = \frac{W_{ref}L_a}{L_{ref}} \cdot \frac{R_{ref}}{R_a} \qquad \text{Equation 3}$$

Figure 3:
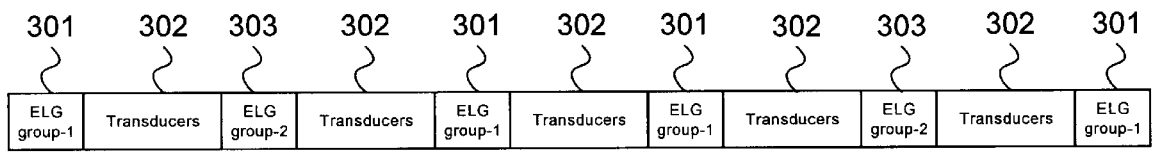
FIG. 3 is a bar containing multiple ELG groups for controlling sensor height and resistance monitoring.
Figure 4:
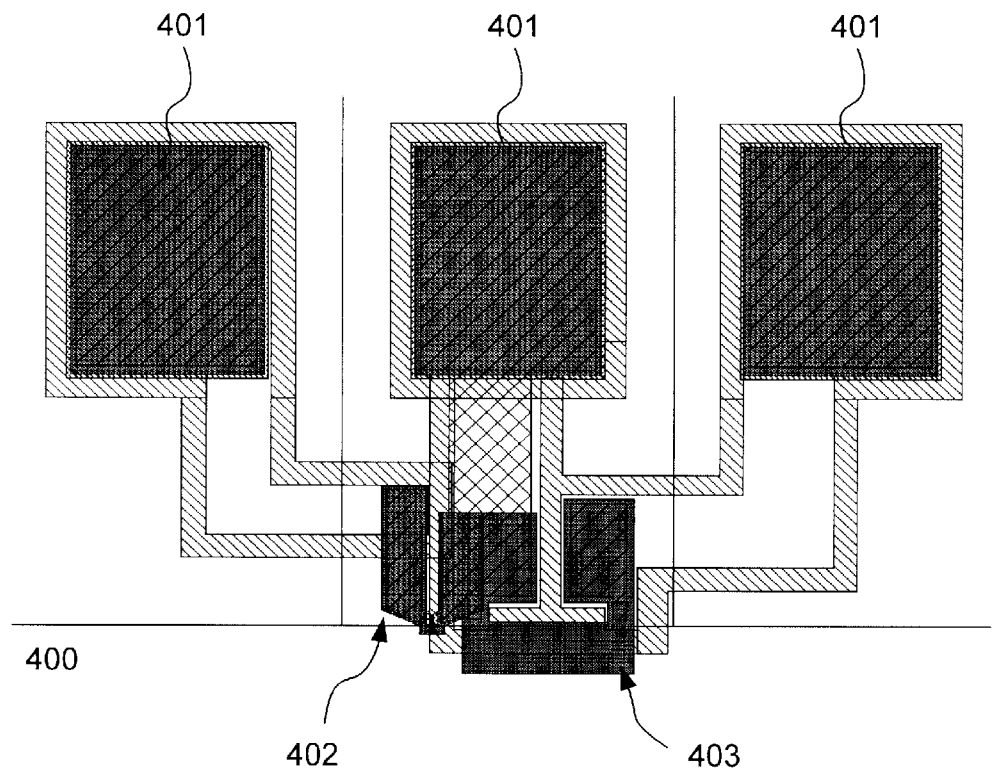
FIG. 4 is a magnified view of Group-1 of FIG. 3, including the dummy transducer and analog resistor.

FIG. 3 shows an embodiment of this ELG design in a bar. To save space and balance the lapping control between rough lap and fine lap, ELG is divided into two groups. FIG.

Figure 5:
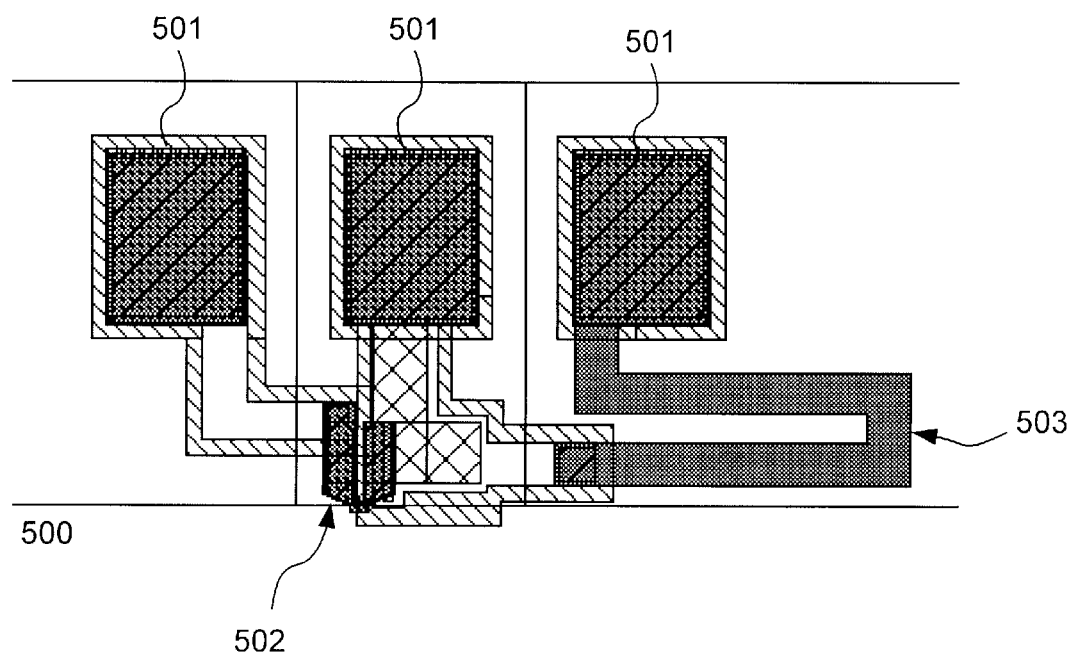
FIG. 5 is a magnified view of Group-2 of FIG. 3, including the dummy transducer and a reference resistor.

4 shows a magnified view of Group-1 301. It includes a dummy transducer 402 and an analog resistor 403, and three pads 401 for measurement connections. FIG. 5 shows a magnified view of Group-2 303. It includes a dummy transducer 502 and a reference resistor 503. Both groups are arrayed in the dicing lane across a bar in the sequence as shown in FIG. 5, with the transducers 302, sandwiched between the groups. During slider machining, $R_a$ and $R_{ref}$ are paired up to calculate the stripe height for rough lap control, and the dummy transducer elements are used for lap to transducer resistance control in fine lap.

It can be desirable to have a reference resistor 503 that is as long and as wide as possible. FIG. 5 shows this resistor 503 in a snake-like shape, which effectively increases the length and width of the resistor.

The reference and analog resistance are measured during lapping, and the SH can be calculated from the finite element method simulation based equations. The SH information from the ELG is then used for the control in the rough lap, and process monitoring in the fine lap. The dummy transducer resistances are used for the fine lap control to reduce the transducer resistance standard deviation. Improved resistance distribution at the slider transfer curve test can be achieved through this structure. The smearing noise monitoring capability of this ELG design can also be controlled by measuring the electrical characteristics of the dummy transducer.

Figure 6:
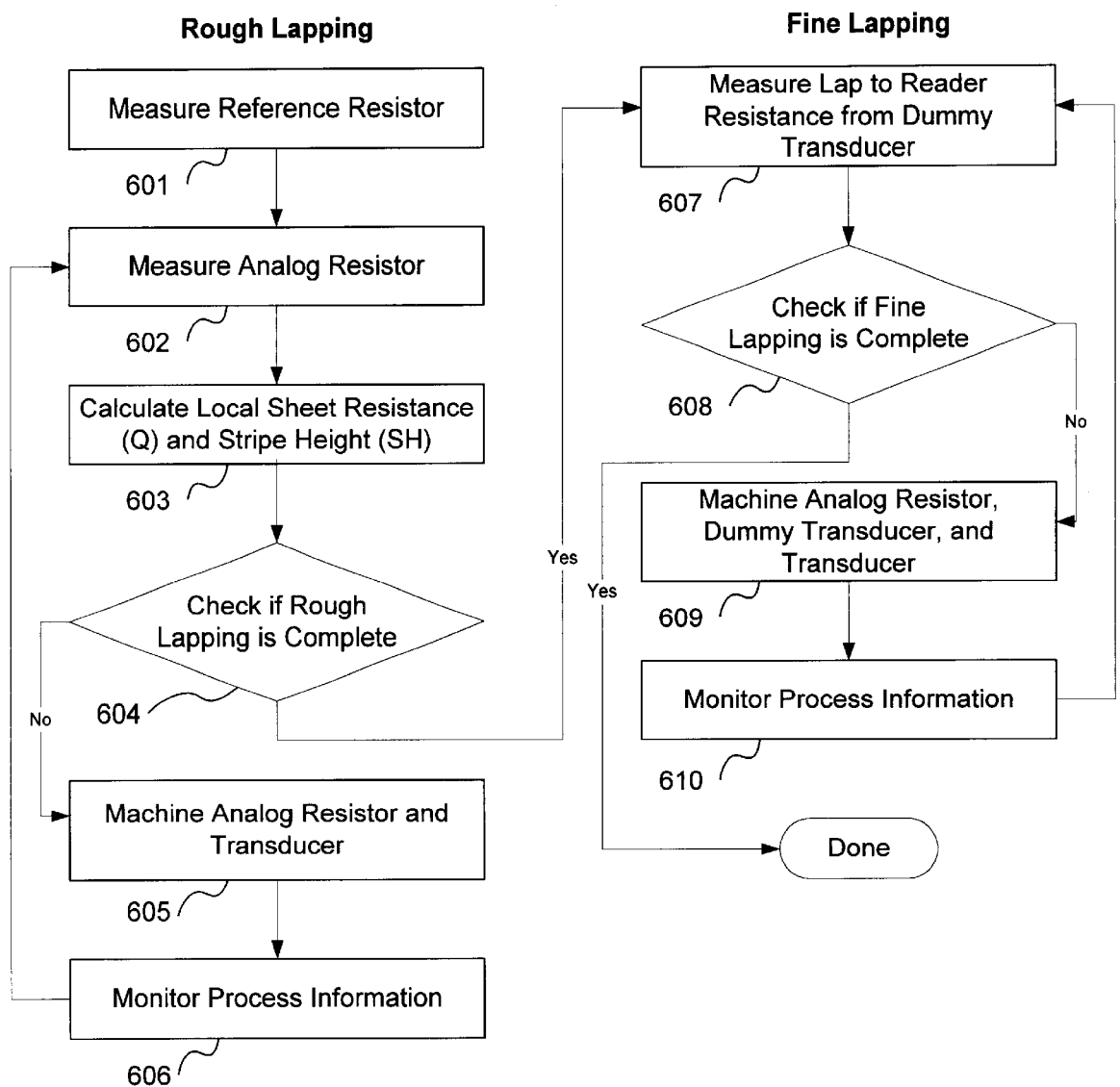
FIG. 6 illustrates the process for the ELG system for both MRE sensor height and resistance monitoring.

FIG. 6 describes an embodiment of the process of machining a transducer. First, the reference resistor is measured 601. Next, the analog resistor is measured 602. Based on these measurements, local sheet resistance (Q) and stripe height (SH) are calculated 603. If the stripe height indicates that the rough lapping is complete, then the fine lapping process starts 604. If not, the analog resistor and transducer are machined 605. The machining process information, such as material removal rate, is monitored to control the machining process 605. The analog resistance is then measured 602, and the process is continued until the stripe height indicates that the rough lapping is complete 604.

During the fine lapping process, the lap to reader resistance is measured from the dummy transducer 607. This controls how much material needs to be lapped before a desired resistance, for example, 40 ohms, can be achieved. If the fine lapping is complete, then the process is done 608. If not, the analog resistor, dummy transducer, and transducer are machined 609. The machining process information, such as material removal rate, is monitored to control the machining process 610. The lap to reader resistance is then measured from the dummy transducer 607, and the process is continued until the lap to reader resistance indicates that the fine lapping is complete 608.

Although the present invention has been described with reference to preferred embodiments, workers skilled in the art will recognize that changes may be made in form and detail without departing from the spirit and scope of the invention.

What is claimed is:

1. A method of lapping a magnetic transducer, the method comprising:
   rough lapping the transducer based on a first signal; derived as a function of a plurality of resistor elements and
   fine lapping the transducer based on a second signal from a dummy transducer.

2. The method of claim 1, wherein the dummy transducer has electrical properties substantially similar to electrical properties of the magnetic transducer.

3. The method of claim 1, wherein the first signal comprises a stripe height calculated as a function of a reference resistor element and an analog resistor element.

4. The method of claim 3, wherein the first signal further comprises the stripe height calculated as a function of the reference resistor element's width, length, and resistance, and the analog resistor element's length and resistance.

5. The method of claim 3, further comprising exposing the analog resistor element to machining before calculating the stripe height.

6. The method of claim 3, wherein the reference resistor element is approximately 40 µm wide and 700 µm long.

7. The method of claim 3, wherein the analog resistor element is approximately 25 µm wide and 70 µm long.

8. The method of claim 3, wherein the stripe height is further calculated using a third resistor.

9. The method of claim 3, wherein the first signal further comprises local sheet resistance calculated as a function of the reference resistor element's resistance, width, and length.

10. The method of claim 1, wherein the second signal further comprises lap to reader resistance from the dummy transducer and a stripe height calculated from a reference resistor element and an analog resistor element.

11. The method of claim 1, wherein the dummy transducer further provides process noise monitoring capability during lapping.

12. An electrical lap guide (ELG) system for use in lapping a magnetic transducer, the system comprising:
   a plurality of resistor elements, wherein the elements are used to control rough lapping; and
   a dummy transducer, wherein the dummy transducer is used to measure the electrical properties of the transducer to control fine lapping.

13. The system of claim 12, wherein the resistor elements further comprise an analog resistor element and a reference resistor element.

14. The system of claim 13, wherein the reference resistor element is used to calculate local sheet resistance as a function of the reference resistor element's resistance, width, and length.

15. The system of claim 13, wherein the analog resistor element is machined before being used to calculate a stripe height as a function of the reference resistor's width, length, and resistance, and the analog resistor's length and resistance.

16. The system of claim 12, wherein the dummy transducer further comprises shields, which provide process noise monitoring capability during lapping.

17. The system of claim 13, wherein the reference resistor element is approximately 40 µm wide and 700 µm long, and the analog resistor element is approximately 25 µm wide and 70 µm long.

18. The system of claim 13, further comprising a third resistor element, wherein the analog resistor element, reference resistor element and third resistor element are used to calculate stripe height for rough lap control.

19. The system of claim 13, wherein the analog resistor element, reference resistor element, and dummy transducer are divided into two groups on a bar separated by the magnetic transducers, wherein the first group comprises a first dummy transducer and the analog resistor, and the second group comprises a second dummy transducer and the reference resistor.

20. An electrical lap guide (ELG) system for use in lapping a magnetic transducer, the system comprising:
   a plurality of resistor elements, wherein the elements are used to control rough lapping; and;
   dummy transducer means to control fine lapping.

* * * * *